No. 710,363. Patented Sept. 30, 1902.
B. G. LAMME.
METHOD OF STARTING ROTARY CONVERTERS.
(Application filed Feb. 1, 1902.)
(No Model.)
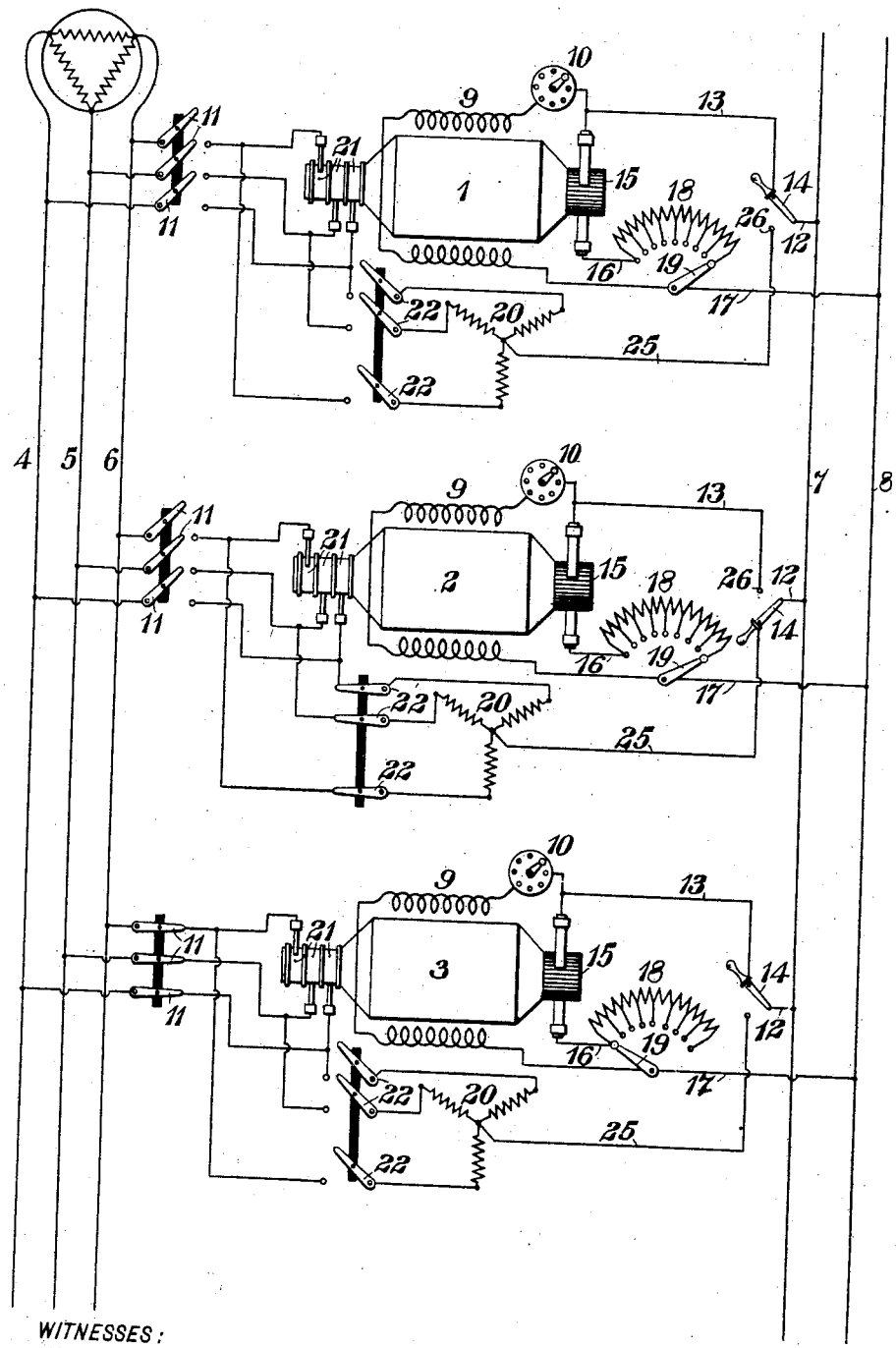
WITNESSES:
C. L. Belcher
J. C. Morse
INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA.

METHOD OF STARTING ROTARY CONVERTERS.

SPECIFICATION forming part of Letters Patent No. 710,363, dated September 30, 1902.

Original application filed October 14, 1901, Serial No. 78,588. Divided and this application filed February 1, 1902. Serial No. 92,210. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Methods of Starting Rotary Converters, of which the following is a specification, this application being a division of my application, Serial No. 78,588, filed October 14, 1901.

My invention relates to systems of electrical distribution, and particularly to such systems as involve the conversion of alternating-current energy into direct-current energy by means of rotary converters.

The object of my invention is to provide a simple and efficient method of starting rotary converters by means of direct-current energy, the voltage of which is less than the normal voltage of the system to be supplied by the machines, but which is more than one-half such voltage.

Since rotary converters which are utilized for converting alternating-current energy into direct-current energy are, in effect, synchronous motors, some special means must be employed for bringing them up to approximately synchronous speed before they are connected to the alternating-current circuit in connection with which they are used.

In the operation of a plurality of rotary converters in parallel it is important that each converter which is to be connected in circuit with one or more which are already in operation should be so connected without an excessive rush of current from either the alternating-current system to the direct-current system, or vice versa.

In case the starting current is supplied at an approximately constant electromotive force and such electromotive force is higher than the normal electromotive force of the rotary converter the desired condition may be brought about by inserting a suitable resistance between the direct-current source of energy and the commutator of the converter. If, however, the direct-current-supply voltage is lower than the normal voltage of the rotary converter, the insertion of resistance to prevent a rush of current from the alternating-current circuit to the direct-current circuit will prevent the rotary converter from attaining to the desired voltage and speed. It follows, therefore, that under the last-mentioned relation of voltages the parallel connection must be made when there is a considerable difference between the alternating-current voltage of the rotary converter and that of the system unless some other method of utilizing the low voltage be employed.

Where a considerable number of rotary converters are employed in a single system, they may be and ordinarily are located in substations that are a considerable distance apart, and it may happen that when it is necessary to start one of the rotary converters in a given substation the direct-current electromotive force in the main direct-current circuit is at this point materially below the normal electromotive force of the system. By utilizing my present invention this relatively low electromotive force may be employed for starting any rotary converter and bringing it to synchronous speed before it is connected to the alternating-current circuit, provided the supply-voltage is more than half the normal voltage of the rotary converter.

My invention is illustrated in the accompanying drawing, the single figure of which is a diagram embodying an alternating-current circuit, a direct-current circuit, and a plurality of rotary converters and coöperating devices.

I have shown in the drawing three rotary converters 1, 2, and 3 for receiving energy in parallel from a three-phase alternating-current circuit 4 5 6 and supplying direct-current energy in parallel to a direct-current circuit 7 8. My invention is, however, not limited to the employment of any specific number of rotary converters or to a three-phase alternating-current-supply circuit. Each of the rotary converters is also shown as provided with a shunt-field-magnet winding 9 and with a regulating-rheostat 10 in circuit therewith, it being understood, however, that my invention is not dependent upon or limited to the employment of this specific type of field-magnet winding.

The alternating-current ends of the rotary converters 1, 2, and 3 are connected to and disconnected from the alternating-current circuit 4 5 6 by means of suitable switches 11, the three switches for each machine being preferably suitably connected, so that they may be operated simultaneously. The direct-current end of each rotary converter is connected to the direct-current circuit 7 8, which in this instance is shown as supplying the current for starting the rotary converters and bringing them up to synchronous speed by means of conductors 12 and 13 and a switch 14 between the line conductors 7 and one brush of the commutator 15 and by conductors 16 and 17, a variable resistance 18, and a switch-arm 19 between the line conductor 8 and the other brush of the commutator 15.

In order to provide the desired voltage for bringing the rotary converter to synchronism before throwing the switches 11 to circuit-closing position, I provide three star-connected balancing-coils 20, having their outer terminals connected to the collector-rings 21 of the rotary converter by means of switches 22, which are preferably connected so as to be thrown simultaneously both to open and to close the circuit. To the common terminal of the coils 20 is connected one end of a conductor 25, the other terminal of which is a contact-piece 26 in position to be engaged by the switch-arm 14 when properly manipulated for that purpose.

The rotary converter 1 and the coöperating devices are indicated in proper relations for starting the rotary converter from a state of rest, the switches 11 and 22 being open and the rotary converter being connected across the circuit 7 8 with the resistance 18 in circuit. This relation of parts is provided in order that the armature of the rotary converter may be caused to generate the small electromotive force necessary to make the balancing-coils and their circuit connections effective in the operation of bringing the rotary converter to synchronous speed and voltage.

As soon as a slow rate of rotation is obtained by reason of the connection shown the switches 14 and 22 may be thrown to the positions indicated in connection with the rotary converter 2, the connections being such, as will be readily seen, that one-half of the armature-winding is in service, and consequently the conditions for one-half the normal voltage of the rotary converter will be secured. Since the resistance 18 is connected in circuit when this change is made, there is no difficulty experienced in making the transfer from full voltage to half voltage. When this condition is reached, the resistance 18 can be gradually cut out of circuit by moving the switch-arm 19, and the field-magnet voltage may be adjusted, by means of the rheostat 10, until the rotary converter reaches synchronous speed. When this speed is attained, the switch 22 will be opened, the switch-arm 14 thrown to the position indicated in connection with rotary converters 1 and 3, and the switch 11 closed, the operative condition of the rotary converter in which it is supplying energy from the alternating-current system 4 5 6 to the direct-current system 7 8 being indicated by the rotary converter 3 and the apparatus connected therewith.

It will be understood without specific illustration that the controlling devices 14, 18, 19, 20, and 22 may, if desired, be embodied in a single apparatus, so that the operation of the controller-handle may serve to make and break the several circuits in the order above enumerated, this arrangement of circuit-controlling devices being within the province of those skilled in the art. It will be also understood that the direct-current energy for starting the rotary converters may be supplied from any suitable source other than that indicated, if desired.

As has already been indicated, my invention is not limited to the employment of specific apparatus, except in so far as limitations may be imposed by the state of the art and expressly set forth in the claims.

I claim as my invention—

1. The method of starting rotary converters which consists in first supplying a direct-current electromotive force of more than half but less than the full, normal, rotary converter voltage to the armature-winding through a resistance and then supplying such voltage to the armature-winding through said resistance and a balancing device.

2. The method of starting rotary converters employed for converting alternating-current energy into direct-current energy which consists in first supplying direct-current voltage of more than half but less than the full normal voltage of the rotary converter to its armature-winding through a resistance, then supplying said electromotive force to the armature-winding through said resistance and "star-connected" balancing-coils and then gradually cutting out the resistance to bring the converter to synchronous speed and voltage.

3. The method of starting rotary converters which consists in supplying direct-current electromotive force of more than half but less than the full normal electromotive force of the rotary converter to its armature-winding through a resistance, then supplying said electromotive force to the armature-winding through said resistance and "star-connected" balancing-coils, then progressively cutting out the resistance until the rotary converter reaches synchronous speed and voltage and finally cutting out the balancing-coils and connecting the rotary converter to the alternating-current-supply circuit.

In testimony whereof I have hereunto subscribed my name this 16th day of January, 1902.

BENJ. G. LAMME.

Witnesses:
JAMES B. YOUNG,
BIRNEY HINES.